(12) United States Patent
Safar et al.

(10) Patent No.: US 11,614,117 B2
(45) Date of Patent: Mar. 28, 2023

(54) REMOVABLE FASTENER FOR STRUCTURAL ELEMENTS AND A METHOD OF ITS USE

(71) Applicant: QUANTUMPARABLE, INC., Cambridge, MA (US)

(72) Inventors: Jonah E Safar, Cambridge, MA (US); Brian Christopher Johnson, Watertown, MA (US); Garth Dean Minette, Milwaukie, OR (US)

(73) Assignee: QUANTUMPARABLE, INC, Cambridge, MA (US)

( * ) Notice: Subject to any disclaimer, the term of this patent is extended or adjusted under 35 U.S.C. 154(b) by 55 days.

(21) Appl. No.: 16/926,020

(22) Filed: Jul. 10, 2020

(65) Prior Publication Data

US 2021/0010512 A1 Jan. 14, 2021

Related U.S. Application Data

(60) Provisional application No. 62/872,500, filed on Jul. 10, 2019.

(51) Int. Cl.
| | |
|---|---|
| *F16B 35/04* | (2006.01) |
| *F16B 5/02* | (2006.01) |
| *E04B 9/10* | (2006.01) |
| *E04B 1/41* | (2006.01) |
| *F16B 2/02* | (2006.01) |
| *F16B 2/20* | (2006.01) |
| *F16B 2/24* | (2006.01) |

(52) U.S. Cl.
CPC ............... *F16B 35/04* (2013.01); *E04B 1/40* (2013.01); *E04B 9/10* (2013.01); *F16B 5/0208* (2013.01); *F16B 2/02* (2013.01); *F16B 2/20* (2013.01); *F16B 2/246* (2013.01)

(58) Field of Classification Search
CPC .......... F16B 35/04; F16B 5/0208; F16B 2/02; F16B 2/20; F16B 2/246; F16B 2/22; F16B 5/121; F16B 21/02; F16B 2200/40; E04B 1/40; E04B 9/10; E04B 1/5818; E04C 2/38
See application file for complete search history.

(56) References Cited

U.S. PATENT DOCUMENTS

| | | | |
|---|---|---|---|
| 3,322,447 A * | 5/1967 | Biggs .................... | E04B 2/763 52/669 |
| 3,604,176 A * | 9/1971 | Campbell ............. | E04B 1/5818 403/255 |
| 3,882,652 A | 5/1975 | Marchello | |

(Continued)

*Primary Examiner* — Rodney Mintz
(74) *Attorney, Agent, or Firm* — Caldwell Intellectual Property Law (57) ABSTRACT

A removable fastener for securing a first stud to a second stud each stud having an aperture with lateral and bottom edges, includes a joining member with a first end and second end having first and second notches sized to admit lateral edges made adjacent by placing the studs back-to-back. Fastener includes a locking member that has a stud end configured to rest on the bottom edges of the apertures and a fastener end configured to attach to the joining member, holding the joining member in position within the apertures when the joining member is engaged within the apertures; the fastener end may include a clip.

19 Claims, 10 Drawing Sheets

(56) References Cited

U.S. PATENT DOCUMENTS

| | | | |
|---|---|---|---|
| 3,904,162 A * | 9/1975 | O'Konski | E04B 2/763 248/222.52 |
| 4,382,710 A * | 5/1983 | Slowbe | F16B 21/02 403/348 |
| 4,858,407 A * | 8/1989 | Smolik | E04B 2/7457 403/392 |
| 5,245,811 A | 9/1993 | Knorr | |
| 5,287,664 A * | 2/1994 | Schiller | E04B 2/7457 52/712 |
| 5,829,908 A * | 11/1998 | Slowbe | E04B 1/2403 403/252 |
| 6,199,336 B1 * | 3/2001 | Poliquin | E04B 2/58 52/261 |
| 6,389,658 B1 | 5/2002 | Pfaller et al. | |
| 6,578,335 B2 | 6/2003 | Poliquin | |
| 6,708,460 B1 | 3/2004 | Elderson | |
| 7,017,310 B2 * | 3/2006 | Brunt | E04B 2/763 52/220.1 |
| 7,596,921 B1 * | 10/2009 | diGirolamo | E04C 3/07 52/696 |
| 7,775,014 B2 | 8/2010 | Karlstroem | |
| 8,205,402 B1 * | 6/2012 | diGirolamo | E04B 2/765 52/669 |
| 8,387,321 B2 | 3/2013 | diGirolamo et al. | |
| 8,590,255 B2 * | 11/2013 | Daudet | E04B 2/763 52/712 |
| 9,109,361 B2 | 8/2015 | Daudet et al. | |
| 9,200,459 B2 | 12/2015 | White | |
| 9,476,194 B1 | 10/2016 | Hulka et al. | |
| 9,849,497 B2 * | 12/2017 | Daudet | B21D 35/002 |
| 9,982,695 B2 | 5/2018 | Zhang et al. | |
| 9,982,837 B2 | 5/2018 | Zhang et al. | |
| 10,590,647 B2 * | 3/2020 | Haba | E04B 2/58 |
| 10,619,343 B2 * | 4/2020 | Heady | E04B 1/58 |
| 10,767,812 B2 * | 9/2020 | Howard | E04H 15/00 |
| 11,174,633 B2 * | 11/2021 | Mordechai | E04B 1/32 |
| 2001/0004820 A1 * | 6/2001 | Poliquin | E04B 2/763 52/766 |
| 2003/0145537 A1 | 8/2003 | Bailey | |
| 2004/0172912 A1 * | 9/2004 | Brunt | E04B 2/763 52/698 |
| 2006/0151199 A1 * | 7/2006 | Uchizono | F16B 5/0685 174/138 R |
| 2006/0191236 A1 * | 8/2006 | Surowiecki | E04B 2/763 52/481.1 |
| 2013/0104490 A1 * | 5/2013 | Daudet | E04B 1/1903 52/696 |
| 2018/0347178 A1 * | 12/2018 | Heady | B21D 5/02 |
| 2019/0063674 A1 * | 2/2019 | Howard | F16M 13/022 |
| 2019/0186120 A1 * | 6/2019 | Haba | E04B 2/62 |
| 2021/0047829 A1 * | 2/2021 | Anderson | E04B 1/40 |
| 2021/0131096 A1 * | 5/2021 | Mordechai | E04B 2/14 |
| 2021/0293263 A1 * | 9/2021 | Yoshida | F16B 21/065 |

* cited by examiner

REMOVABLE FASTENER FOR STRUCTURAL ELEMENTS AND A METHOD OF ITS USE

This application claims the benefit of priority of U.S. Provisional Patent Application Ser. No. 62/872,500, filed on Jul. 10, 2019, and titled "REMOVABLE STUD FASTENER," which is incorporated by reference herein in its entirety.

FIELD OF THE INVENTION

Background

Metal studs are used in a number of construction applications to support or frame walls, windows, doors, or other structural elements of buildings. Typically, such studs are secured in place using conventional fastening technology such as bolts or rivets. Existing mechanisms for fastening studs, however, lack ready detachability and reusability, and thus are unsuitable for some potential applications in which studs might otherwise conveniently be employed.

SUMMARY OF THE DISCLOSURE

In an aspect, a removable fastener for securing a first structural element to a second structural element wherein the first structural element includes a substantially planar first web portion and a first aperture formed in the first web portion, the first aperture having a first aperture width, a first lateral edge, a second lateral edge, and a first bottom edge, and the second structural element includes a substantially planar second web portion and a second aperture formed in the second web portion, the second aperture having a second aperture width, a third lateral edge, a fourth lateral edge, and a second bottom edge includes a joining member. Joining member includes an elongate body having a first end and a second end, the elongate body having a length greater than the aperture width. First end further includes a first notch having a first opening facing away from the second end, the first notch having a first width sized to admit the first lateral edge and the third lateral edge when the joining member is engaged within the first aperture and second aperture. Second end further includes a second notch having a second opening facing away from the first end, the second notch having a second width sized to admit the second lateral edge and the fourth lateral edge when the joining member is engaged within the first aperture and second aperture. Fastener includes a locking member, which includes a stud end configured to rest on the first bottom edge and second bottom edge, and a fastener end configured to attach to the joining member, holding the joining member in position within the first aperture and second aperture when the joining member is engaged within the first aperture and second aperture.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 14 is a flow diagram illustrating an exemplary embodiment for a method of using a fastener. The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Disclosed herein is a fastener that may be used to secure metal studs in a back-to-back configuration by insertion into studs' apertures. Notches in opposite ends of a joining member force edges of two apertures together, securing web portions of studs against one another. A locking member secures joining member in position to maintain the attachment; locking member may also include a notch to further engage aperture edges and may fasten to joining member using a clip.

Figure 1:
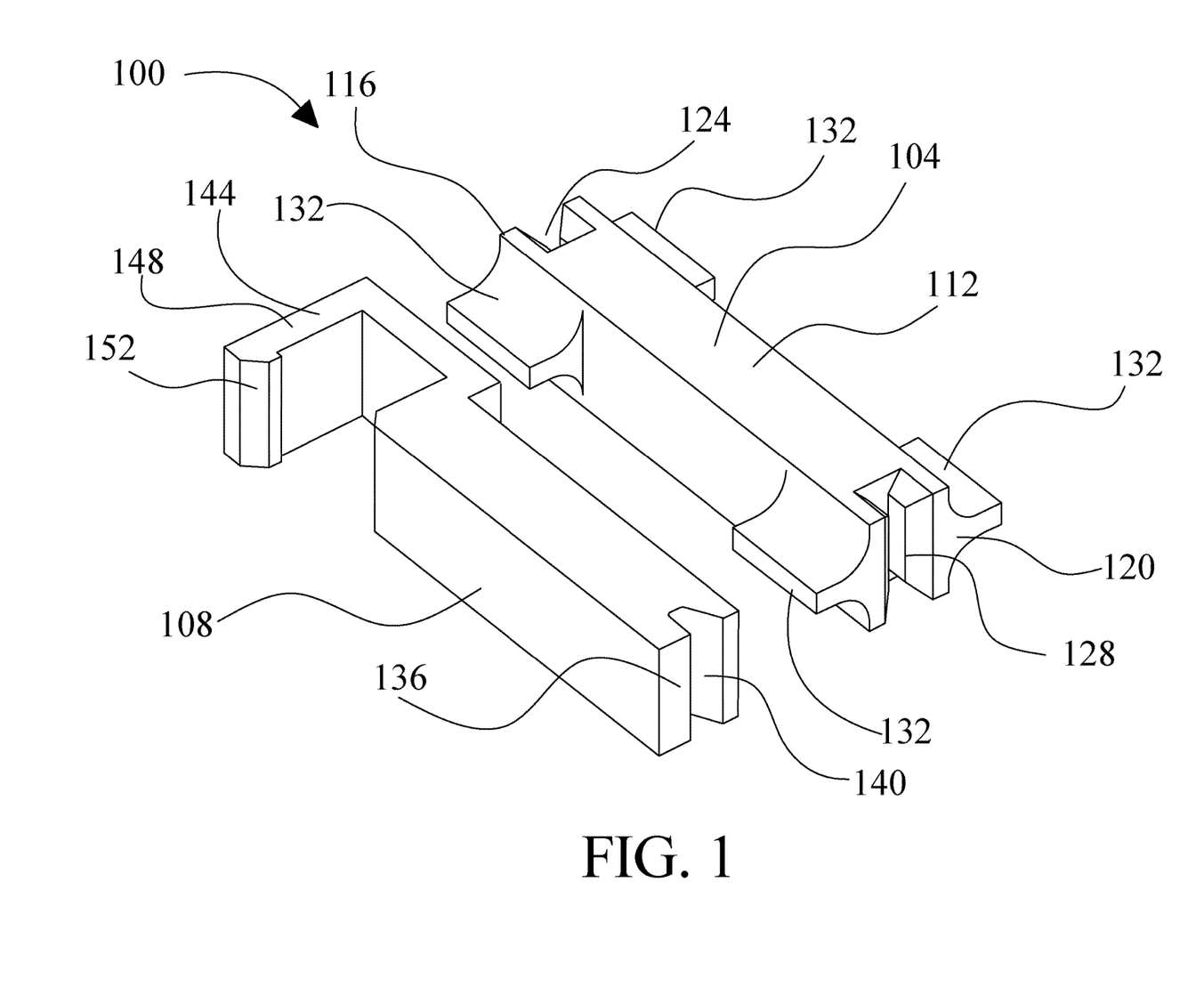
FIG. 1 is a schematic diagram illustrating an exemplary embodiment of a fastener.

Referring now to FIG. 1, an exemplary embodiment of a removable fastener 100 is illustrated. Fastener 100 includes a joining member 104 and a locking member 108. Each of joining member 104 and locking member 108 may be composed of any suitable material or combination of materials, including without limitation plant materials such as bamboo or wood such as maple, ash, or other wood, fiberglass, laminated fiberglass, metal such as steel, titanium, aluminum, combinations of metals, and/or alloys of metals, natural or artificial polymers including without limitation hard rubbers, plastics such as polyvinyl chloride (PVC), acrylonitrile butadiene styrene (ABS), polylactic acid (PLA), acrylonitrile styrene acrylate (ASA), polyethylene terephthalate (PET), polycarbonate (PC), high impact polystyrene (HIPS), polyvinyl acetate (PVA), or the like, carbon fiber, graphene, or any other material combination usable to provide desired material properties to joining member 104 and locking member 108, which may include sufficient rigidity to hold together studs as described in further detail below.

Figure 2:
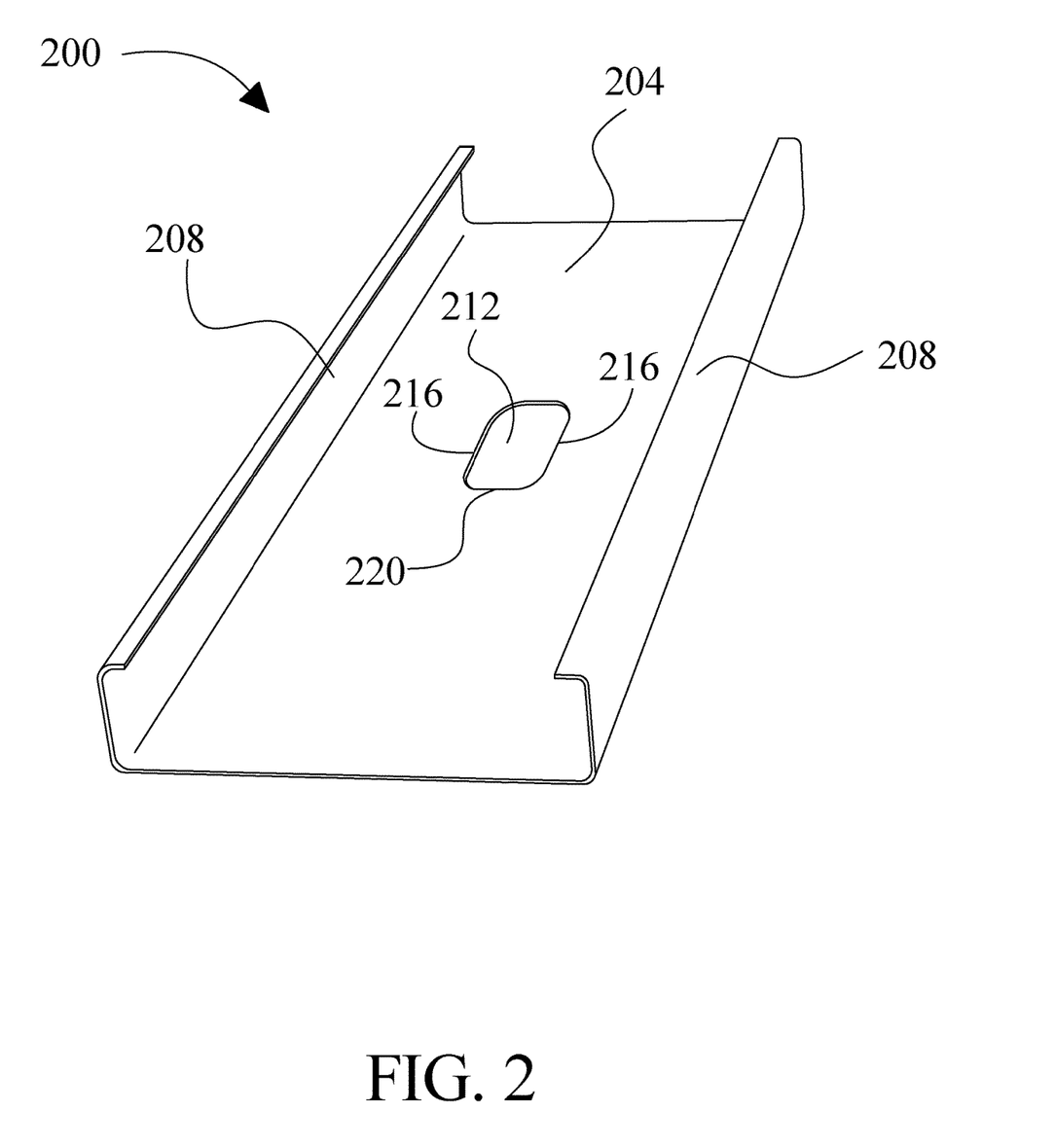
FIG. 2 is a schematic diagram illustrating an exemplary embodiment of a metal stud.

Referring now to FIG. 2, an exemplary embodiment of a structural element 200 of that may be fastened to another such structural element using an embodiment of a removable fastener 100 is illustrated for the purpose of context. A structural element 200 may be used to frame internal and/or external walls of buildings such as offices, houses, or the like, for instance by attachment to metal channels affixed to upper or lower wooden or steel beams in building frames and/or to other walls, ceilings, or other structural elements. Structural elements 200 may vary from lightweight studs used to frame non-load-bearing walls to heavier and/or stronger studs that can help maintain the structural integrity of buildings, such as in load-bearing walls. Structural elements 200 may alternatively or additionally be included in modular wall sections that may be detached and/or reassembled, including without limitation by using a fastener 100 as disclosed herein. A structural element 200 as illustrated in FIG. 2 may include a substantially planar portion known as a web 204, which may be disposed orthogonally to a plane of a wall containing the structural element 200. Perpendicular to web 204, and typically projecting in a direction parallel to a wall in which a structural element 200 is installed, are two flanges 208 that together with the web 204 form a rectangular U-shaped cross-section. An aperture 212 may be formed in the web 204; aperture 212 may have the form of a rectangle, a rectangle with rounded corners, an oval, a T-shape, or any other suitable form. An aperture 212 may be used to link two structural elements together with cross-braces to form, for instance, a window frame, and/or to permit wires and/or pipes to be run through the wall between structural elements, passing through apertures 212. Typically, two structural elements of matching types or brands will have apertures 212 at the same or substantially the same locations along the web 204, such that where two structural elements are placed back-to-back, signifying as used herein that the two structural elements' webs 204 are in contact while the flanges 208 of the two structural elements project in opposite directions away from the two webs 204, the two apertures 212 may be aligned, so that edges of the two apertures 212 are together.

Still referring to FIG. 2, each aperture 212 may have two lateral edges 216, defined for the purposes of this disclosure as making up vertical sides of the aperture 212. An aperture 212 may have a width, which is defined as used in this disclosure as a horizontal distance between the two lateral edges 216 at some height within the aperture 212, where "vertical" means aligned with a longitudinal axis of bilateral symmetry of a structural element 200, which axis is typically arranged in a vertical position when the structural element 200 is used in a wall or other structural feature, and "horizontal" means orthogonal to the vertical direction, and thus typically in a horizontal position and/or direction when the structural element 200 is used in a wall or other structural feature. Each aperture 212 may have a bottom edge 220, defined for the purposes of this disclosure as an edge joining two lateral edges 216, and defining a bottom of the aperture 212 with respect to the vertical when a structural element containing the aperture 212 is placed in its typical position within a wall or other structural feature. Thus, for instance where a fastener 100 is used as described herein to secure a first structural element 200a to a second structural element 200b, the first structural element 200a may be characterized as including a substantially planar first web 204 portion and a first aperture 212 formed in the first web 204 portion, the first aperture 212 having a first aperture 212 width, a first lateral edge, a second lateral edge, and a first bottom edge 220, and the second structural element 200b may be characterized as including a substantially planar second web 204 portion and a second aperture 212 formed in the second web 204 portion, the second aperture 212 having a second aperture 212 width, a third lateral edge, a fourth lateral edge, and a second bottom edge 220.

Figure 3:
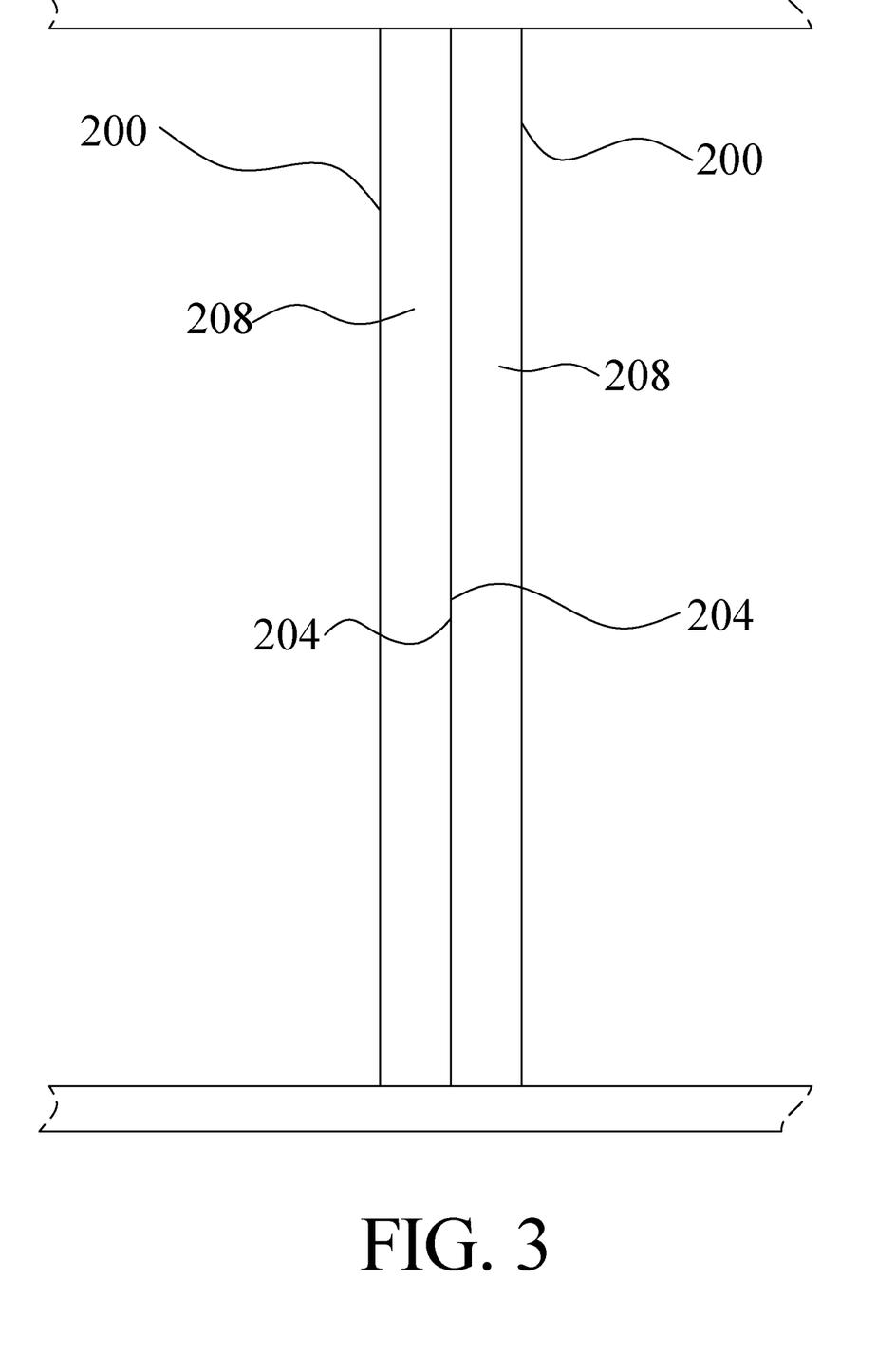
FIG. 3 is a schematic diagram illustrating an exemplary embodiment of a pair of metal studs placed back-to-back.

Referring now to FIG. 3, an exemplary embodiment of a first structural element 200a and second structural element 200b placed in back-to-back positions as described above is illustrated. First web 204 portion and second web 204 portion may be in contact with each other. Flanges 208 may be projecting away from each other. In an embodiment, upper and lower vertical ends of first structural element 200a and second structural element 200b may be resting or secured in horizontal channels 300 to form a frame. Structural elements may be formed by sheet-metal manufacturing processes; for instance, structural elements may be pressed and/or bent to form flanges 208 and punched or cut to form apertures 212.

Referring again to FIG. 1, joining member 104 includes an elongate body 112. Body 112 may include any elongate body 112 suitable cross-sectional form, including any regular or irregular polygonal form, any regular or irregular curved form, and/or any combination thereof such as without limitation polygonal forms with rounded external or internal vertices or the like. As a non-limiting example, body 112 may have a substantially rectangular cross-sectional form. Cross section of body 112 may vary along the length of body 112; one or more portions of body 112 may have uniform or substantially uniform cross-sections. Joining member 104 may have a first end 116 and a second end 120; body 112 may have a length running from the first end 116 to the second end 120. In an embodiment, the length of body 112 is greater than the first and/or second aperture 212 width; in other words, at the point in first and/or second aperture 212 where joining member 104 is held when locking member 108 is engaged as described in further detail below, the aperture 212 width at that point may be less than the length of the body 112.

Still referring to FIG. 1, first end 116 of joining member 104 includes a first notch 124 having a first opening facing away from second end 120. First notch 124 may have the form of a slot created in or carved out of first end 116; that is, where first end 116 includes a first end 116 surface, which may be substantially orthogonal to an axis drawn from first end 116 to second end 120, notch may be formed in first end 116 surface. When joining member 104 is placed in first and/or second aperture 212 and extending from one lateral edge to another lateral edges 216, first notch 124 may be oriented facing one or more lateral edges 216; for instance, first notch 124 may have a first width sized to admit a first lateral edge and a third lateral edge when the joining member 104 is engaged within the first aperture 212 and second aperture 212, for instance in a position in which joining member 104 is maintained by locking member 108 as described in further detail below. First notch may be beveled to admit lateral edges 216; in other words, first notch 124 may be wider at first notch and narrow in a slanting or curved fashion, which may produce the effect of pulling web 204 portions of a first structural element 200a and second structural element 200b together.

With continued reference to FIG. 1, second end 120 of joining member 104 includes a second notch 128 having a second opening facing away from first end 116. Second notch 128 may have the form of a slot created in or carved out of second end 120; that is, where second end 120 includes a second end 120 surface, which may be substantially orthogonal to an axis drawn from first end 116 to second end 120, notch may be formed in second end 120 surface. When joining member 104 is placed in second and/or second aperture 212 and extending from one lateral edge to another lateral edge, second notch 128 may be oriented facing one or more lateral edges 216; for instance, second notch 128 may have a second width sized to admit the second lateral edge and the fourth lateral edge when the joining member 104 is engaged within first aperture 212 and second aperture 212, for instance in a position in which joining member 104 is maintained by locking member 108 as described in further detail below. Second notch may be beveled to admit lateral edges 216; in other words, second notch 128 may be wider at an opening of second notch 128 and narrow in a slanting or curved fashion, which may produce the effect of pulling web 204 portions of a first structural element 200a and second structural element 200b together.

In an embodiment, and still referring to FIG. 1, joining member 104 may include at least a grip projection 132, the at least a grip projection 132 having at least a distal end that extends orthogonally to the first web 204 portion when the joining member 104 is engaged within the first aperture 212 and second aperture 212. At least a grip projection 132 may be a projection that a user may be able to hold onto and/or grip when inserting joining member 104 into a first aperture 212 and second aperture 212. At least a grip projection 132 may have any suitable shape, including without limitation a form of a ridge or sheet-like projection from a side of joining member 104, so oriented that when first notch 124 is engaged with first and third lateral edges 216 and second notch 128 is engaged with second and fourth lateral edges 216, at least a grip projection 132 extends in a direction orthogonal to a plane containing first aperture 212, second aperture 212, first web 204 portion and/or second web 204 portion, such that distal end is farther from first aperture 212, second aperture 212, first web 204 portion and/or second web 204 portion than body 112. In an embodiment, a ridge making up at least a grip projection 132 may extend into a substantially flat sheet having a lesser thickness than a thickness of body 112; sheet may flange outward to the body 112 at a proximal end joined to the body 112. In an embodiment, at least a grip projection 132 may include a grip projection 132 adjacent to or at first end 116; two grip projections 132 opposite each other across body 112 at first end 116 may be included. In an embodiment, at least a grip projection 132 may include a grip projection 132 adjacent to or at second end 120; two grip projections 132 opposite each other across body 112 at second end 120 may be included. At least a grip projection 132 may include four grip projections 132; for instance, at least a grip projection 132 may include two opposing grip projections 132 at first end 116 and two opposing grip projections 132 at second end 120. At least a grip projection may alternatively or additionally have a form of a ring or annulus (not shown, which may have an interior diameter sufficient for insertion of a user's finger; ring or annulus may have a through-hole in a plane orthogonal to first web portion as shown for at least a grip projection 132. Additional slots, holes, or other elements may be incorporated in joining member 104 for insertion of tools or the like.

With continued reference to FIG. 1, locking member 108 includes a stud end 136 configured to rest on first bottom edge 220 and second bottom edge 220. Stud end 136 may include a flat surface that rests on first bottom edge 220 and second bottom edge 220; alternatively or additionally stud end 136 may include a stud end notch 140 configured to admit first bottom edge 220 and second bottom edge 220. Stud end notch 140 may have any form suitable for use as first and/or second notch 128 as described above. Stud end 136 may be composed of any material suitable for use in composition of joining member 104 and/or locking member 108; stud end 136 may be composed of elastomeric material or other high-friction material to help maintain stud end 136 on first bottom edge 220 and second bottom edge 220, for instance where stud end 136 does not include a notch. Stud end 136 may include a magnet.

Still referring to FIG. 1, locking member 108 includes a fastener end 144 configured to attach to the joining member 104, holding the joining member 104 in position within the first aperture 212 and second aperture 212 when the joining member 104 is engaged within the first aperture 212 and second aperture 212. Fastener end 144 may include any suitable fastener, including without limitation a snap fastener, a slide-release fastener, a bolt or screw fastener, a hook and loop fastener, an adhesive such as a pressure-activated adhesive, or the like. Fastener end 144 may include a flexible member that secures fastener end 144 to joining member 104, for instance by tying, using a double-loop buckle, a tri-glide, or similar facility. Fastener end 144 may include a clip 148; for purposes of this disclosure, a "clip" is an element having a portion that secures fastener end 144 to joining member 104 by means of an elastic recoil force generated by displacement of the portion as it is moved into a fastened position. For instance, clip 148 may include a cam element 152 that, when forced past joining member 104, displaces an arm, generating an elastic recoil force in the arm or in a biasing means coupled thereto, such as a spring or elastic element. Elastic recoil force may act to grip joining member 104; alternatively or additionally, cam element 152 may be forced past joining member 104, permitting the arm to "snap" back into a neutral position with the cam element 152 on an opposite side of joining member 104, thus securing joining member 104 between the cam element 152, the arm, and one or more additional surfaces of locking member 108. Persons skilled in the art, upon reviewing the entirety of this disclosure, will be aware of various alternative or additional methods that may be used to fasten fastener end 144 to joining member 104. In an embodiment, body 112 may have an exterior surface, and clip 148 may have an internal surface conforming to the external surface of body. Arm may rest against a first surface of body 112 when clip 148 is fastened to body; cam element 152 may rest against a second surface of body when the clip is fastened to body. Second surface of the body may be orthogonal to first surface of body 112. For instance, and without limitation, cam element may be opposite a surface of clip from which arm emanates, such that body is trapped between cam element and the opposite surface of clip.

Figure 4A:
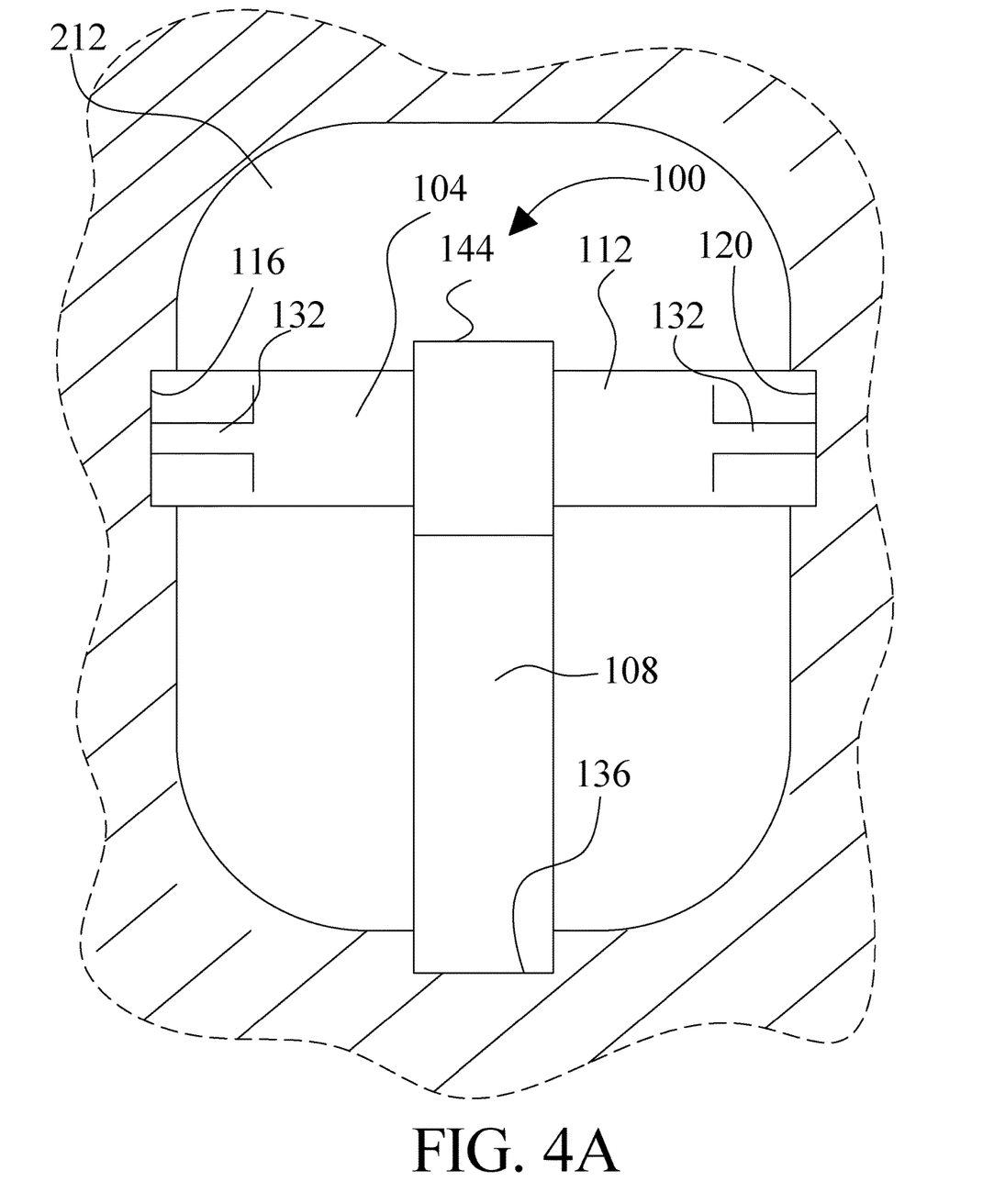
FIG. 4A is a schematic diagram illustrating an exemplary embodiment of a fastener deployed within a pair of apertures.
Figures 4B, 4C:
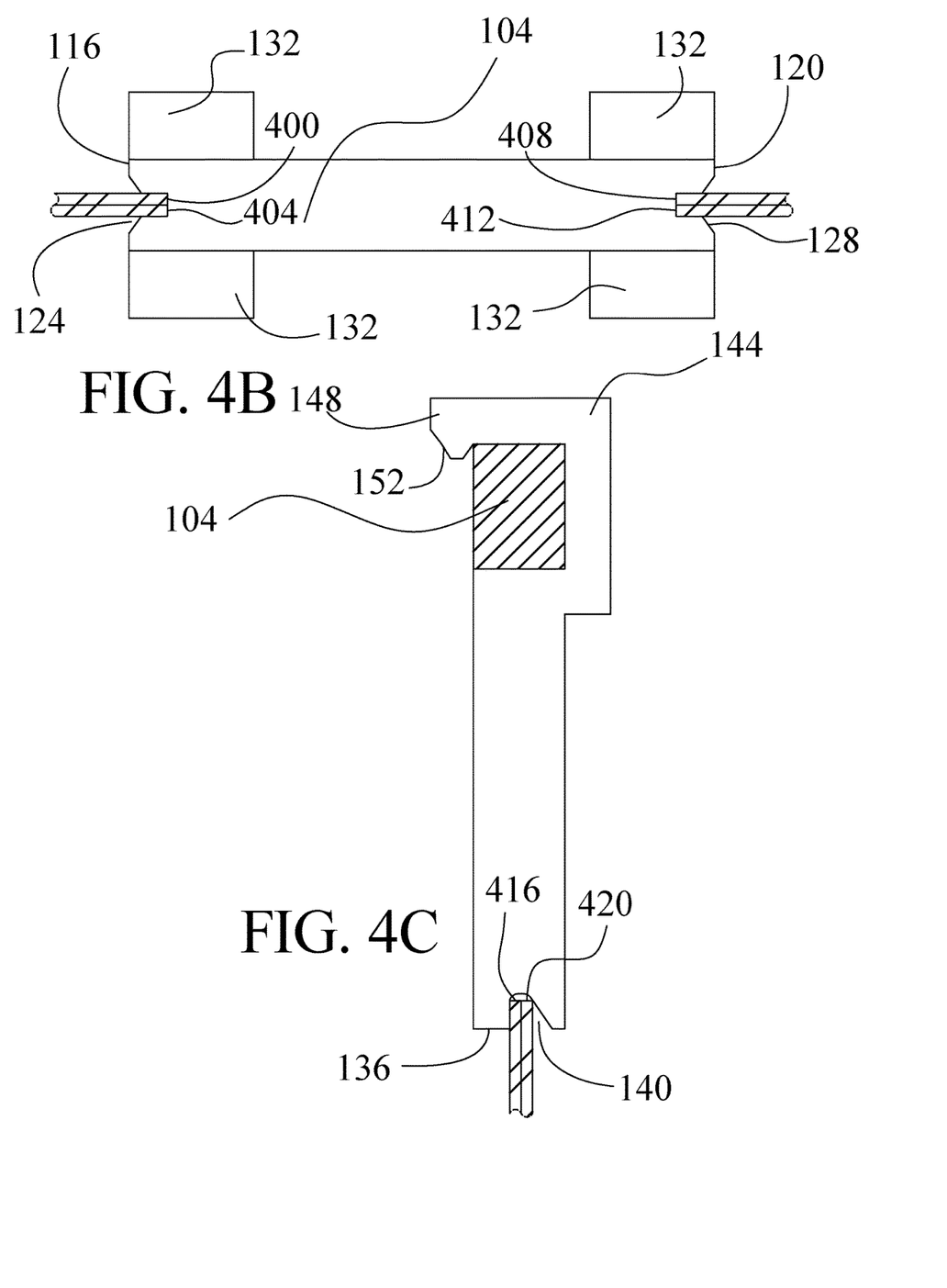
FIG. 4B is a schematic diagram illustrating an exemplary embodiment of a joining member deployed within a pair of apertures.
FIG. 4C is a schematic diagram illustrating an exemplary embodiment of a locking member deployed within a pair of apertures and fastened to a joining member.

Referring now to FIG. 4A, fastener 100 may be used to attach two structural elements together by placing a first structural element 200a and second structural element 200b back to back, with first and second aperture 212 lined up. Joining member 104 may then be inserted within first and second aperture 212 in a horizontal position so that first and third lateral edges 216 are inserted in first notch 124 and second and fourth lateral edges 216 are inserted in second notch 128. Locking member 108 may them be placed resting on first and second bottom edges 220 with fastening end attached to joining member 104; joining member 104 may thus be immobilized in a horizontal position wherein first and third lateral edges 216 are inserted in first notch 124 and second and fourth lateral edges 216 are inserted in second notch 128. As shown in FIG. 4B, first lateral edge 400 and third lateral edge 404 may be held together by first notch 124, while second lateral edge 408 and fourth lateral edge 412 are held together by second notch 128; as a result, first web 204 portion and second web 204 portion may be held securely together. As shown in FIG. 4C, where stud end 136 of locking element further includes a third stud end notch 140, a first bottom edge 416 and second bottom edge 420 may be inserted in third notch; this may further secure first web 204 portion and second web 204 portion together, while supporting locking member 108 so as to continue to immobilize joining member 104.

The above-described embodiments confer various advantages. A user may rapidly secure together two studs and/or two structural elements incorporating such studs, in a back-to-back configuration by placing joining member 104 within first and second apertures 212 and engaging locking member 108; detachment may be effected equally rapidly by disengagement of fastening end from joining member 104 and removal of joining member 104 and locking member 108 from first and second apertures 212. Joining member 104 may be easily grasped and controlled using grip extensions, where present, allowing attachment and detachment in circumstances of limited mobility or visibility. Such temporary or detachable securing of structural elements together may be used for rapid reconfiguration of modular structures, or to temporarily hold structural elements in position while securing such structural elements to channels or other structural elements.

Figure 5:
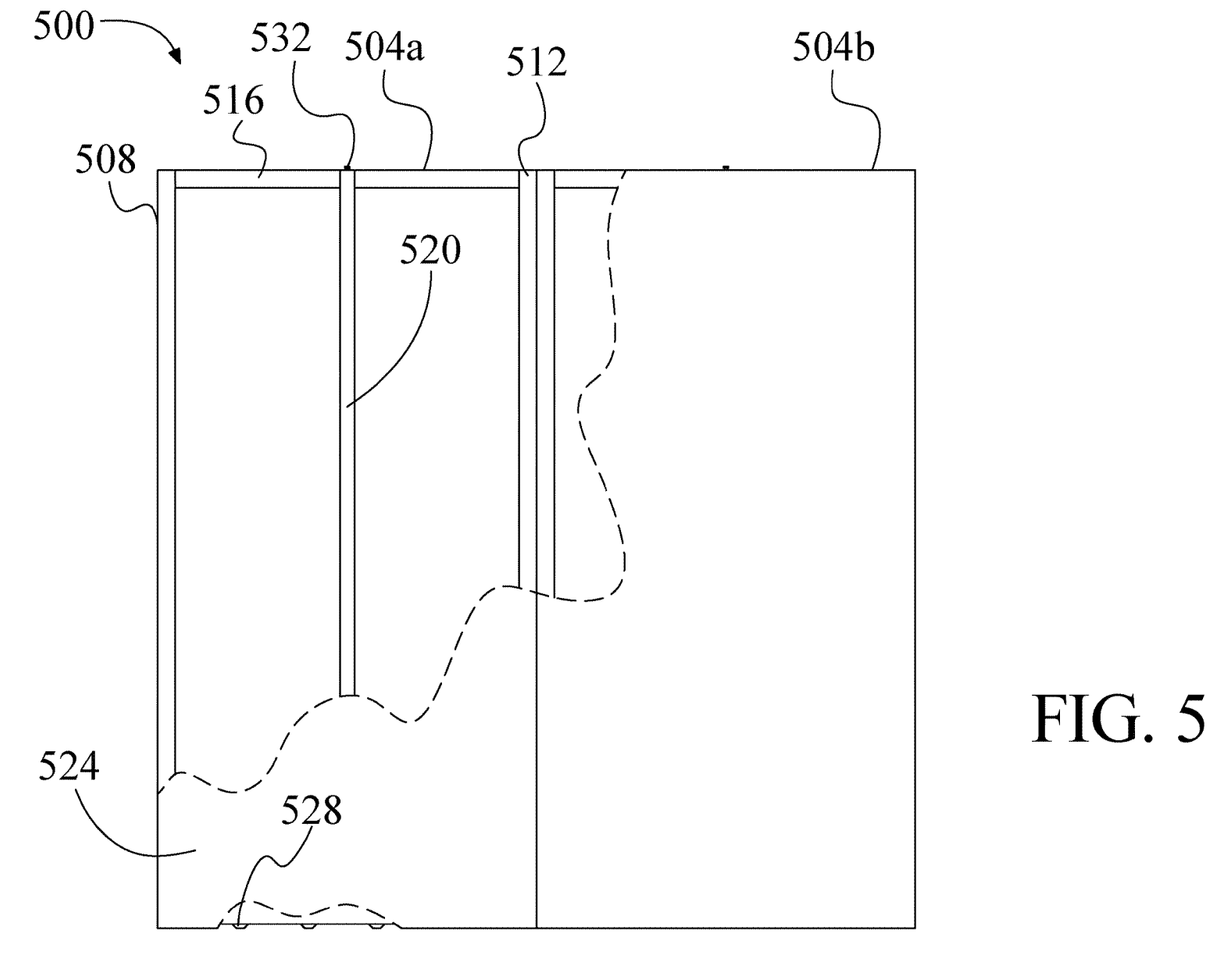
FIG. 5 is a schematic diagram illustrating an exemplary embodiment of an assembly.

Referring now to FIG. 5, fastener 100 may be used in combination with a reconfigurable structural panel assembly 500. Assembly 500 may include a first panel 504a. First panel 504a may include a first structural element 508, which may include any structural element as described above. For instance, and without limitation, wherein first structural element 508 may include a substantially planar first web portion. First structural element 508 may include a first aperture formed in the first web portion. First aperture may have a first aperture width, a first lateral edge, a second lateral edge, and a first bottom edge, as described above. First structural element 508 may include a first exterior surface facing away from the first panel 504a, and a first interior surface facing into the first panel 504a; that is, first exterior surface may be a surface of web portion that may be placed against a corresponding web portion for attachment using fastener 100 as described above. First panel 504a may include a second structural element 512, which may include any structural element as described above. For instance, and without limitation, wherein second structural element 512 may include a substantially planar second web portion. Second structural element 512 may include a second aperture formed in the second web portion. Second aperture may have a second aperture width, a third lateral edge, a fourth lateral edge, and a second bottom edge. Second structural element 512 may include a second exterior surface facing away from the first panel 504a, and a second interior surface facing into the second panel 504b; that is, second exterior surface may be a surface of web portion that may be placed against a corresponding web portion for attachment using fastener 100 as described above. Each of first structural element 508 and second structural element 512 may include multiple apertures as described above, each of which may be used in fastening structural elements to additional structural elements in other frames and/or posts as described in further detail below, for instance and without limitation using fastener 100.

Still referring to FIG. 5, first panel 504a includes a structural frame 516 connecting the first structural element 508 to the second structural element 512. Structural frame 516 may have one or more horizontal cross-pieces connecting first and second structural element 512. Horizontal cross-pieces may be constructed of any suitable material for first and second structural element 512, including metal, wood, plywood, or the like. Structural frame 516 may include one or more vertical elements, such as without limitation a central structural element 520; central structural element 520 may include any element suitable for use as first structural element 508 and may be equidistant in first frame from first structural element 508 and second structural element 512. Structural frame 516 may include one or more sheets of material such as sheets of plastic, plywood, metal, or the like, which may occupy one or more spaces between structural elements and/or cross-pieces. In an embodiment, structural frame 516 may be rectangular and/or substantially rectangular in profile. Elements of structural frame 516 may be fastened together in any suitable manner, including without limitation welding, riveting, bolting, adhesion, or the like; persons skilled in the art, upon reviewing the entirety of this disclosure, will be aware of various ways in which elements of structural frame 516 may be secured together.

As a non-limiting, illustrative example, and further referring to FIG. 5, structural frame 516 may include three steel studs, with the outer two facing their flat sides to the outside of the frame, and a central stud oriented in either direction. The outer two may have a standardized orientation of apertures in the studs, for instance to permit joining first panel 504a to additional panels and/or posts as set forth in further detail below. Continuing the example, structural frame 516 may include 4' steel track at a top and bottom of structural frame 516 as horizontal cross-pieces. Still continuing the example, each overlap point between steel track and first, second, and/or central structural element 520 may be secured using, for instance, two spot-welds on each side for a total of 24 points on the frame. Continuing the example, rubber O-ring may be placed in a center-most pass-thru hole in each of the two outside studs and the top hole of the middle stud to allow for wire stringing. An assembly 500 jig may be used to cut tracks to length, as well as hold structural frame 516 pieces together for welding or other fastening.

Still referring to FIG. 5, first panel 504a may include an exterior skin 524 covering structural frame 516 from first structural element 508 to second structural element 512. Exterior skin 524 may form a substantially planar exterior surface of panel. Exterior skin 524 may be constructed of any suitable material and/or combination of materials, including without limitation flexible materials. Flexible materials may include materials that can be bent by hand and returned to an original and/or flattened state without permanent deformation, such as without limitation natural or artificial textile materials, sheets of material such as leather, paper, natural and/or artificial polymer, felts, or the like. Skin 524 may alternatively or additionally be constructed of rigid materials such as medium density fiberboard (MDF) or other composites, fiberglass, sheet-metal, wood veneer paneling, plywood, plastic, sheetrock, or the like. Skin 524 may alternatively or additionally be composed of transparent materials such as glass or acrylic; for instance, first panel 504a may have one or more windows formed therein. Skin 524 and/or a sheet of material may have one or more openings cut or otherwise formed within skin 524 for access to interior elements, and/or to permit inclusion in first panel 504a of one or more additional items such as without limitation electronic devices, appliances, or the like.

Further referring to FIG. 5, skin 524 may, as described in further detail below, overlap first panel 504a and/or extend beyond structural frame 516, to form a continuous surface and/or to disguise frame locations and/or appearances. Skin 524 may be selected and/or deployed, with any combination of elements as described in this disclosure, to create an aesthetically pleasing and/or functional interior space when elements such as first panel 504a and additional elements that will be set forth below are combined together with skin 524 to form rooms, to form corridors, to form nooks, or otherwise define interior spaces. For instance, and without limitation, where panels as described herein are used to create walls of a room, a sheet of skin 524 may have a length of an entire wall and may be joined to additional sheets of skin 524 at internal corners, to create a seamless appearance.

Continuing to refer to FIG. 5, attachment of skin 524 to structural frame 516 and/or other elements of first panel 504a may be effected using any suitable attachment devices and/or means such as without limitation rivets, press-fasteners 100, magnets, latches which may be actuated manually, electronically, or the like, locks which may be actuated manually electronically or the like, insertion into tracks and/or grooves, use of bolts, screws, and/or tabs, and/or any other attachment mechanism that may occur to persons skilled in the art upon reviewing the entirety of this disclosure.

As used herein, a press fastener is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minn. Press-fastener may also include adhesives, including reusable gel adhesives, GECKSKIN adhesives developed by the University of Massachusetts in Amherst, of Amherst, Mass., or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface.

Still referring to FIG. 5, first panel 504a may include one or more internal elements (not shown) such as thermal and/or acoustic insulation, electrical and/or data exchange wiring including without limitation coaxial and/or ethernet cables, tubing for fluids, gases, or the like, light fixtures, storage compartments, light switches, electrical outlets, or the like.

With continued reference to FIG. 5, first panel 504a may include at least a first void located within the panel frame and at the first aperture, the first void bordered by the first interior surface. First void may be an empty space into which a person may reach to manipulate a fastener 100 as described above for the purpose of connecting first panel 504a to a post and/or additional panel. Where first structural element 508 includes multiple apertures, there may be multiple voids and/or first void may communicate with two or more of multiple apertures, permitting a user access for fastening and/or unfastening first panel 504a to or from other panels and/or posts. First panel 504a may include at least a second void located within the first panel 504a and at the second aperture, the first void bordered by the first interior surface; at least a second void may include any void as described above for at least a first void.

Still referring to FIG. 5, first panel 504a may include at least an anchoring mechanism. At least an anchoring mechanism may include any mechanism for anchoring first frame to a ceiling and/or floor above and/or below first frame. Anchoring mechanism may include, without limitation, a floor anchoring mechanism 528, which may include without limitation feet such as rubber feet or other elastomeric feet, feet adapted for securing to a carpeted surface such as feet with one or more spikes, wheels and/or projections for insertion into tracks and/or recesses in a floor, or the like. Floor anchoring mechanism 528 may include a threaded rod, which may be used akin to a lolly-beam that twists top and bottom pads into place with a wrench, anchoring via friction; alternatively or additionally, a ratchet mechanism, pneumatic mechanism, or the like that may enable extension of feet to create pressure, for instance in combination with a ceiling attachment mechanism. Ceiling attachment mechanism may include any mechanism suitable for use as floor attachment mechanism. Ceiling attachment mechanism may alternatively or additionally include hooks, ties, or other elements to attach a top edge of first frame to one or more rails or other elements in a ceiling such as a drop ceiling. As a further non-limiting example, a bottom portion of first frame may be rubberized, so that an overall weight of a completed structure holds assembly 500 system in place; periodic eye-bolts may extend from a top of first frame to guy-wires or the like to provide additional top stability.

Further referring to FIG. 5, assembly 500 may include a second panel 504b second panel 504b may include any item suitable for use as first panel 504a. Second panel 504b may be secured to first panel 504a using a fastener 100 as described above. Assembly 500 may include a plurality of panels, which may be combined in various configurations as described in further detail below.

Figure 6:
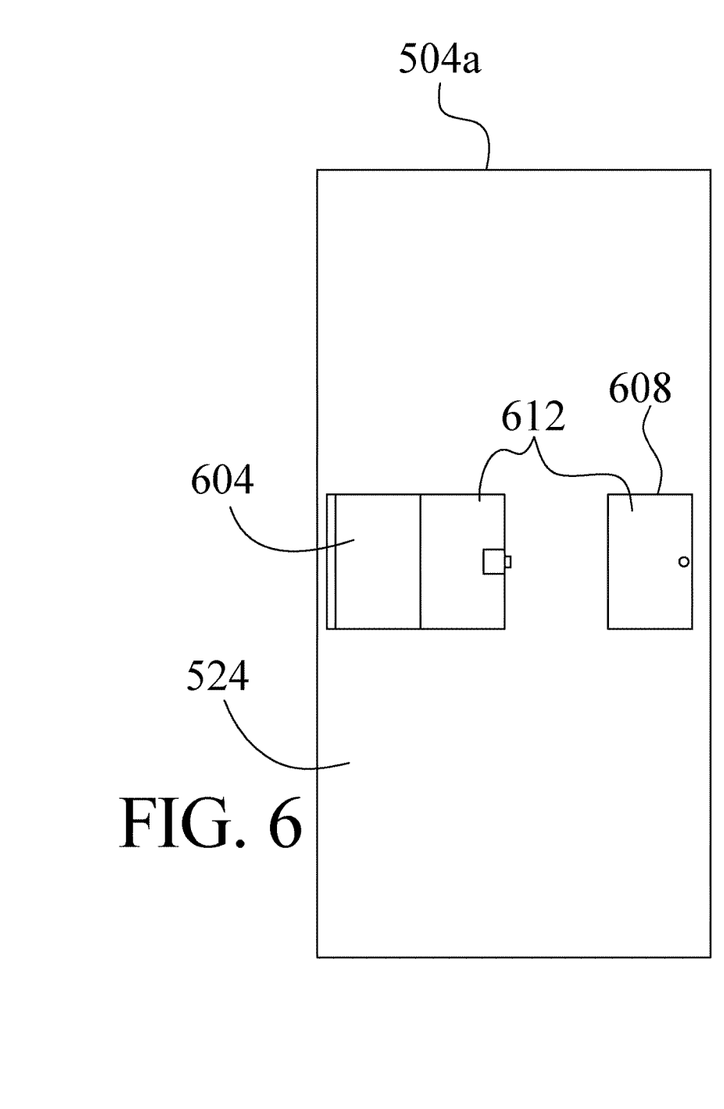
FIG. 6 is a schematic diagram illustrating an exemplary embodiment of a first panel.

Referring now to FIG. 6, each of first void and/or second void may be accessed, without limitation, using a one or more doors in skin 524. Doors may be hinged using any suitable hinge. Doors may slide. Doors may have a latching mechanism accessible from an exterior of first panel 504a; latching mechanism may be manually, mechanically, and/or electronically actuated. Alternatively or additionally, voids may be accessible using a removable sheet of material which may be secured over void using any mechanism suitable for securing skin 524 over structural frame 516.

Figure 7:
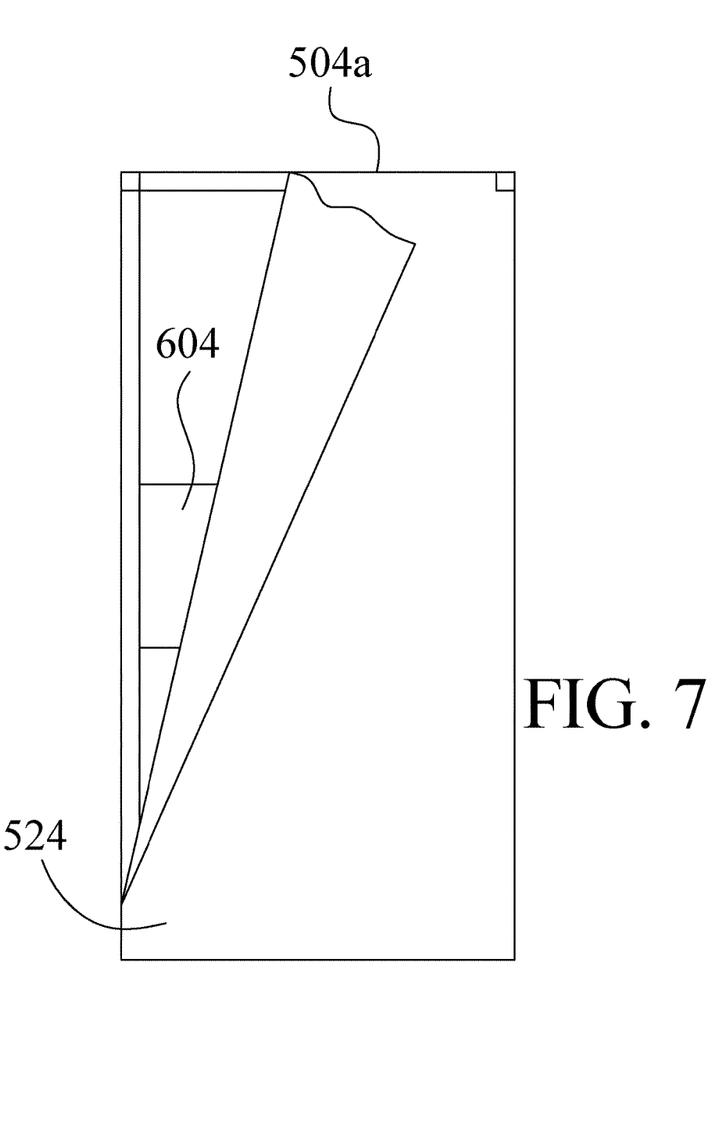
FIG. 7 is a schematic diagram illustrating an exemplary embodiment of a first panel.

Alternatively or additionally, and referring now to FIG. 7, first void and/or second void may be accessed by wholly or partially removing skin 524. For instance, where skin 524 is flexible, skin 524 may be partially detached from structural frame 516 and bent or folded away from void, permitting access; alternatively or additionally, skin 524 may be attached to first frame and/or other elements of assembly 500 after securing with fastener 100, permitting access for securing. First void and/or second void may alternatively or additionally permit access to securing mechanisms to secure elements of assembly 500 to a ceiling and/or floor as described above.

Figure 8:
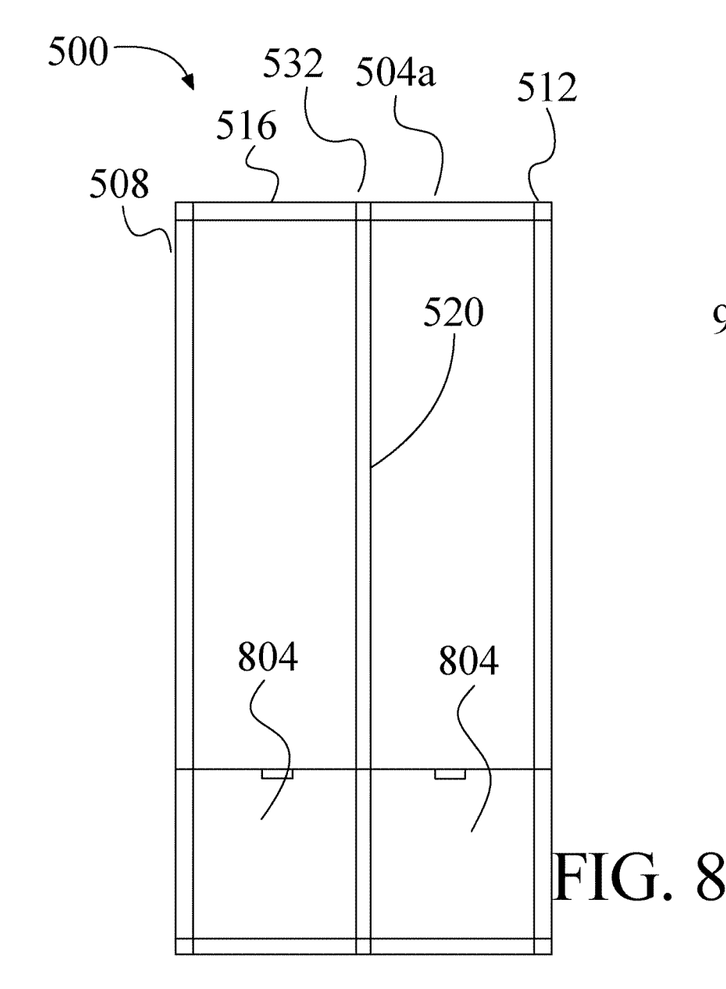
FIG. 8 is a schematic diagram illustrating an exemplary embodiment of a first panel.

Referring now to FIG. 8, a non-limiting example of a potential variation of first panel 504a is illustrated. First panel 504a may include a bottom kickboard 804 attached to the structural frame 516. Kickboard 804 may be a part of structural frame 516, leading to significant increased structural stability. Additionally, use of kickboard 804 may size of a required skin 524. Further design variants alternatively or additionally have a top panel which is much narrower than the kickboard. A kickboard may handle additional abuse by users while protecting first panel 504a from closer to ground wear and tear. Kickboard 804 may also allow skin 524 to be stiffer due to less suspended material weight.

Figures 9, 10:
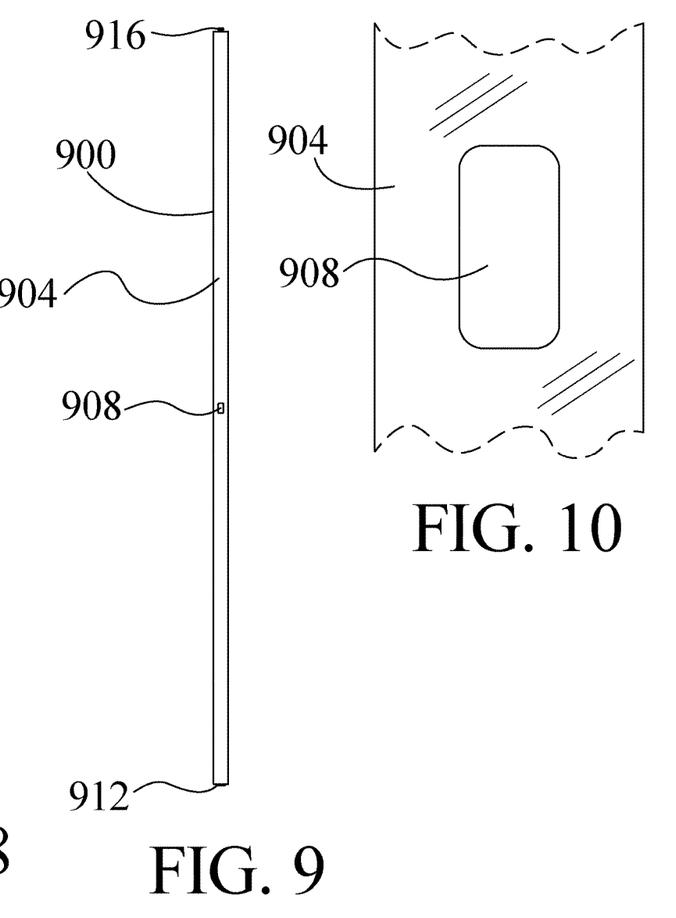
FIG. 9 is a schematic diagram illustrating an exemplary embodiment of a post.
FIG. 10 is a schematic diagram illustrating an exemplary embodiment of a post.

Referring now to FIG. 9, assembly 500 may include a post 900. A posts 900 may include a four-sided structural element, having four web surfaces 904 in a square array. Web surfaces 904 may include apertures 908, which may be implemented in any manner suitable for implementation of apertures in first and/or second structural element 512 as described above. Any panel in assembly 500 may be attached to any of four web surfaces of post 900. Post 900 may function to allow for frames to be attached to form ninety-degree angles, to make a T-junction or to make across junction. Post 900 may be additionally kitted with floor anchoring mechanism 912 and/or ceiling anchoring mechanisms allow them to be anchored to the floor and/or ceiling anchoring mechanism 916 to help stabilize frame assemblies, using any suitable securing mechanism as described above. Alternative designs may be similarly constructed that allow for three sided, or NT-sided posts 900 for more complex room design. FIG. 10 illustrates a partial view of post 900 with an aperture in post 900.

Figure 11:
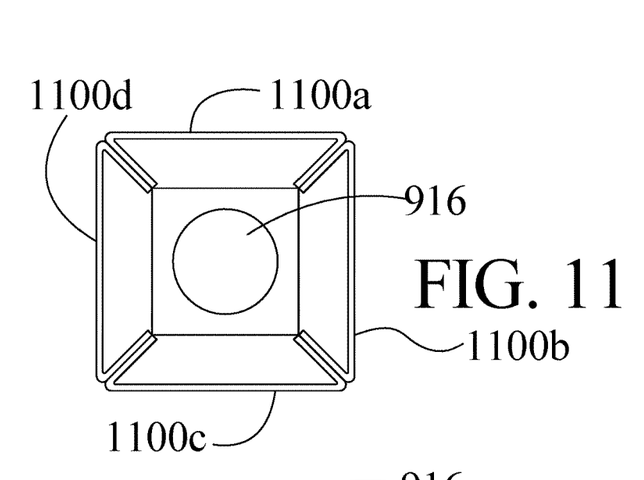
FIG. 11 is a schematic diagram illustrating an exemplary embodiment of a post.

Referring now to FIG. 11, post 900 may be formed, in a non-limiting example, by securing four structural elements 1100a-d, such as studs, together, for instance by bending sides and welding and/or riveting them together; alternatively or additionally, posts 900 may be constructed by trimming sides of steel studs; four of the trimmed pieces may be put into a square with an 'over/under' repeated pattern. A tack-welder may then be used at a top and bottom to make four welds each, holding the post 900 together. Tack-welder may be fit through a number of the stud pass-thru cut-outs to do some additional tacks along the length of the post 900 for additional stability. Structural elements may alternatively or additionally be fastened together using any suitable process including any type of welding, bolting, riveting, or the like. Alternatively or additionally, post 900 may be formed as a single monolithic structure using any suitable process, including without limitation molding, machining, sheet metal processes such as cutting, bending, and/or stamping, and/or any other suitable manufacturing process.

Figure 12:
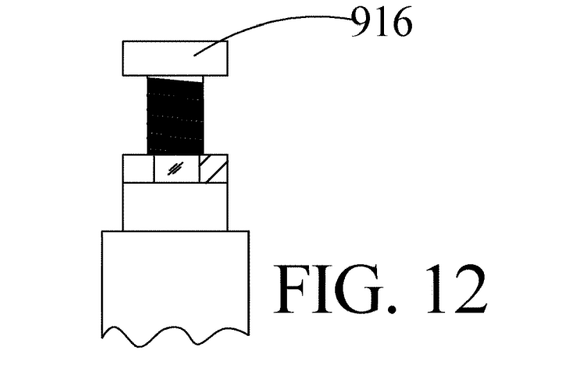
FIG. 12 is a schematic diagram illustrating an exemplary embodiment of an anchoring mechanism.

Still referring to FIG. 11, at least a securing mechanism may be affixed in an interior of post 900, at a top or bottom end thereof. Securing mechanism may be secured using any suitable fastening mechanism, including an engineering fit such as a press fit, welding, adhesion, riveting, bolting, screwing, or the like. FIG. 12 illustrates an exemplary embodiment of an attachment mechanism 1200 including a threaded rod 1204 supporting a foot and/or cap 1208 which may provide friction against a surface when pressed thereon by the threaded screw.

Figure 13:
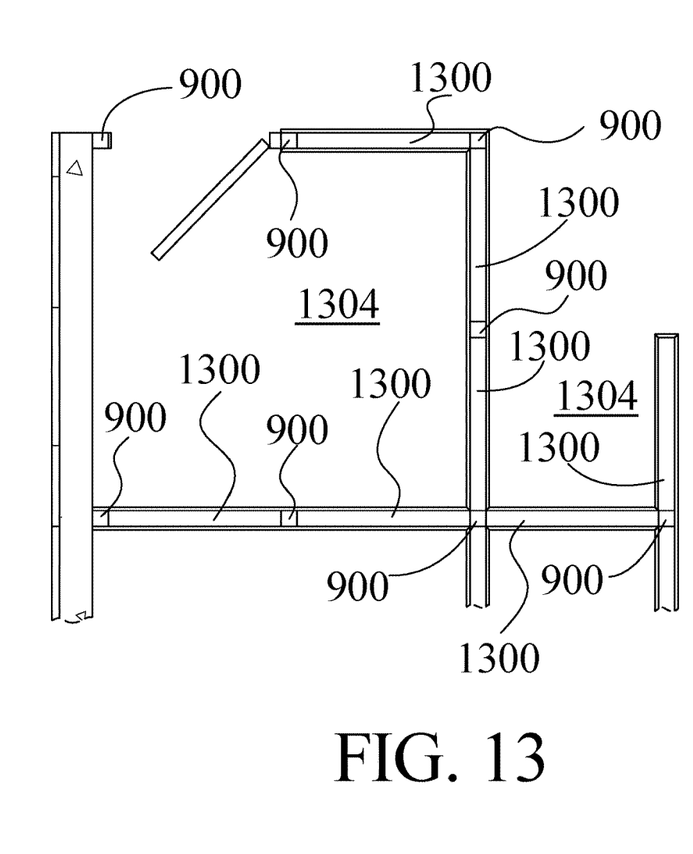
FIG. 13 is a schematic diagram illustrating an exemplary embodiment of an assembly.

Referring now to FIG. 13, a top view of an exemplary embodiment of assembly 500 is provided. Assembly 500 may include a plurality of panels 1300 and/or posts 900 which may be combined to form one or more interior spaces 1304. Interior spaces may include rooms, offices, corridors, nooks, bays, or any other internal space that may occur to persons skilled in the art upon reviewing the entirety of this disclosure. Assembly 500 may be assembled by attaching panels to each other and to posts 900. Posts 900 may be used to attach panels at angles to one another to form corners, T-junctions, crosses, and/or any other desired configuration. Assembling may further include securing posts 900, panels, or the like to ceilings and/or floors using attachment mechanisms.

With continued reference to FIG. 13, posts 900 and/or panels may be attached to additional features such as door frames, doors, exterior walls, load-bearing walls, columns including without limitation anti-seismic columns, or the like. Attachment may be effected using any suitable fastening devices and/or techniques including adhesion, fastening with bolts, screws, rivets, or the like, and/or fastening using a fastener 100 as described above. Persons skilled in the art, upon reviewing the entirety of this disclosure, will be aware of various possible additional features and/or attachment processes that may be employed consistently with this disclosure.

Still referring to FIG. 13, at least a skin 524 may be placed over panels and/or posts 900; at least a skin 524 may overlap joints between panels and/or between panels and posts 900. At least a skin 524 may overlap and/or join at corners; this may enable skin 524 to form a seamless or apparently seamless surface on interior walls formed using panels. Wiring (not shown) may be run through, e.g., apertures or other openings in structural elements and/or frame of any panel and/or post 900; fixtures, electrical outlets, switches, communication ports, or the like may be attached to wiring through openings in skin 524. Other tubing such as without limitation air, water, vacuum, or other tubing used for pneumatic devices, medical devices, or the like may be fed through panels and/or apertures to corresponding devices, fixtures, nozzles, or the like. Wiring and/or tubing may be fed to and/or from additional features such as other interior or external walls and/or wiring and/or tubing systems within a building.

Further referring to FIG. 13, a user may reconfigure assembly 500 by detaching skin 524, panels, posts 900, and/or additional features from one another and reattaching in a new configuration. Alternatively or additionally, a damaged element such as a skin 524, post 900, panel, or other element may be detached from assembly 500, including any necessary and/or useful disassembly 500 steps, and replaced with a new and/or repaired element. Any reconfiguration may further include replacement and/or reconfiguration of wires, tubes, or the like; alternatively or additionally, repair, replacement, and/or addition of wires, tubes, and/or anything attached thereto may be effected by removal of skin 524 and/or otherwise accessing panel interiors, swapping skin 524 with a skin 524 having openings at desired points, and/or cutting or otherwise forming new openings in skin 524, followed by installation of any desired article, fixture, and/or element.

Figure 14:
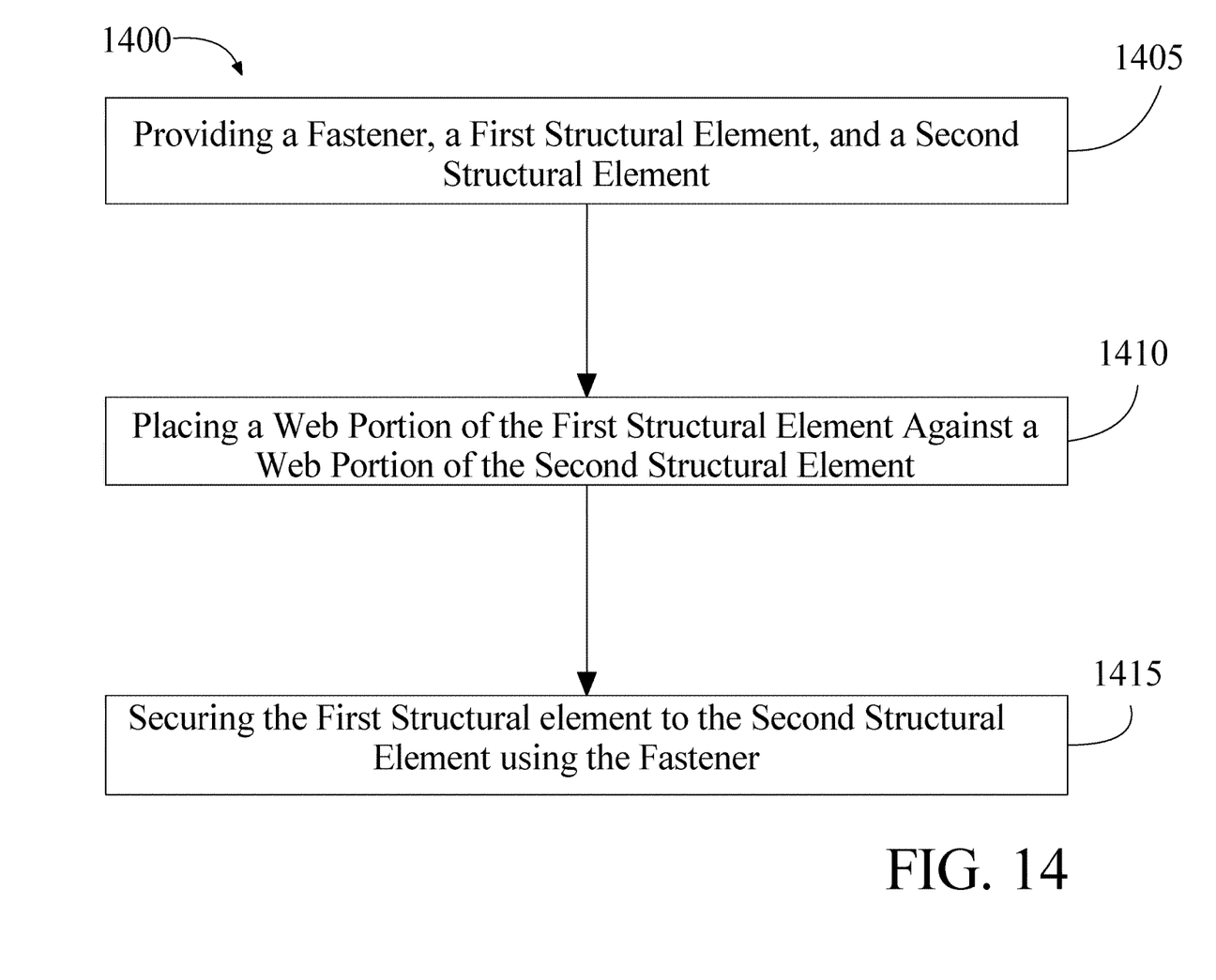

With reference now to FIG. 14, an exemplary embodiment of a method 1400 of using a fastener 100 to secure structural elements is illustrated. At step 1405, a fastener 100 as described above, a first structural element 508, and a second structural element 512, are each provided; this may be implemented, without limitation, as described above in reference to FIGS. 1-13. Alternatively or additionally, any fastener, latching mechanism, locking mechanism, or the like may be used, including without limitation bolts, hooks, magnets, or the like. First structural element 508 may include any first structural element 508 as described above; for instance, first structural element 508 may include a substantially planar first web portion and a first aperture formed in the first web portion, the first aperture having a first aperture width, a first lateral edge, a second lateral edge, and a first bottom edge. First structural element 508 may be incorporated in a first panel 504*a* and/or a post 900 as described above. Second structural element 512 may include any structural element as described above; for instance, second structural element 512 may include a substantially planar second web portion and a second aperture formed in the second web portion, the second aperture having a second aperture width, a third lateral edge, a fourth lateral edge, and a second bottom edge. Second structural element 512 may be incorporated in a post 900. Second structural element 512 may be incorporated in a second panel 504*b*.

At step 1410, and still referring to FIG. 14, web portion of first structural element 508 may be placed against web portion of second structural element 512; this may be implemented, without limitation, as described above in reference to FIGS. 1-13. At step 1415, first structural element 508 is secured to second structural element 512 using fastener 100; this may be implemented, without limitation, as described above in reference to FIGS. 1-13. Any other assembly 500, disassembly 500, and/or reconfiguration steps as described above may be performed as part of method 1400, including without limitation attaching skin 524 to panels and/or posts 900, securing panels and/or posts 900 to ceiling and/or floor using anchoring mechanisms, joining multiple elements together, or the like.

In an embodiment, fastener 100, structural elements, and/or elements incorporating structural elements may enable rapid and straightforward construction and/or reconfiguration of internal spaces such as offices, residential spaces, and/or recreational spaces. Insertion, removal, and/or decoration of walls, doors, windows, or the like may be performed at low cost with relatively unskilled labor.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve a fastener as described in this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A fastening system, comprising:
a removable fastener configured to secure a first structural element to a second structural element wherein the first structural element includes a substantially planar first web portion and a first aperture formed in the first web portion, the first aperture having a first aperture width, a first lateral edge, a second lateral edge, and a first bottom edge, and the second structural element includes a substantially planar second web portion and a second aperture formed in the second web portion, the second aperture having a second aperture width, a third lateral edge, a fourth lateral edge, and a second bottom edge, the fastener comprising:
a joining member, the joining member including an elongate body having a first end and a second end, the elongate body having a length greater than each aperture width, wherein:
the first end further comprises a first notch having a first opening facing away from the second end, the first notch having a first width configured to receive the first lateral edge and the third lateral edge when the joining member is engaged within the first aperture and second aperture; and
the second end further comprises a second notch having a second opening facing away from the first end, the second notch having a second width configured to receive the second lateral edge and the fourth lateral edge when the joining member is engaged within the first aperture and second aperture; and
a locking member, wherein the locking member comprises:
a stud end configured to rest on the first bottom edge and second bottom edge, wherein the stud end has a stud end notch configured to receive the first bottom edge and the second bottom edge; and
a fastener end configured to attach to the joining member, holding the joining member in position within the first aperture and second aperture when the joining member is engaged within the first aperture and second aperture.

2. The system of claim 1, wherein the locking member is orthogonal to the joining member when the fastener end is attached to the joining member.

3. The system of claim 1, wherein the stud end notch is beveled.

4. The system of claim 1, wherein the first notch is beveled.

5. The system of claim 4, wherein the second notch is beveled.

6. The system of claim 1, wherein the joining member includes a first grip projection, the grip projection having at least a distal end that extends orthogonally to the first web portion when the joining member is engaged within the first aperture and second aperture.

7. The system of claim 6, wherein the first grip projection is adjacent to the first end.

8. The system of claim 7, further comprising a second grip projection adjacent to the second end.

9. The system of claim 8, wherein the first grip projection is on a first surface of the joining member, and further comprising a third grip projection on a second surface of the joining member, wherein the second surface of the joining member is opposite the first surface of the joining member.

10. The system of claim 1, wherein the fastener end further comprises a clip.

11. The system of claim 10, wherein the body has an exterior surface, and the clip has an internal surface conforming to the exterior surface of the body.

12. The system of claim 11, wherein the body has a rectangular cross-sectional form at a point of attachment of the clip.

13. The system of claim 10, wherein the clip further includes:
an arm; and
a cam element, the cam element configured to displace the arm when forced past the joining member, generating an elastic recoil force in the arm.

14. The system of claim 13, wherein the body has a width, and the arm is longer than the width of the body.

15. The system of claim 13, wherein:
- the arm rests against a first surface of the body when the clip is fastened to the body;
- the cam element rests against a second surface of the body when the clip is fastened to the body; and
- the second surface of the body is orthogonal to the first surface of the body.

16. A method of using the fastening system of claim 1, the method comprising:
- providing the fastener, first structural element, and second structural element;
- placing the web portion of the first structural element against the web portion of the second structural element; and
- securing the first structural element to the second structural element with the fastener such that the fastener is engaged within the first aperture and the second aperture.

17. The method of claim 16, wherein the first structural element is incorporated in a first panel.

18. The method of claim 17, wherein the second structural element is incorporated in a post.

19. The method of claim 17, wherein the second structural element is incorporated in a second panel.

* * * * *